United States Patent [19]

Zeitlin et al.

[11] 4,226,836

[45] Oct. 7, 1980

[54] METHOD FOR SEPARATING MOLYBDENUM VALUES FROM SEA NODULES

[75] Inventors: Harry Zeitlin, Honolulu, Hi.; Quintus Fernando, Tucson, Ariz.

[73] Assignee: University Patents, Inc., Norwalk, Conn.

[21] Appl. No.: 675

[22] Filed: Jan. 3, 1979

[51] Int. Cl.$^2$ ............... C01G 3/10; C01G 45/10; C01G 39/00; C01G 51/10
[52] U.S. Cl. ............................... 423/41; 423/49; 423/59; 423/150; 423/DIG. 4
[58] Field of Search ............... 423/DIG. 4, 41, 49, 423/59, 150

[56] References Cited

U.S. PATENT DOCUMENTS

| 2,817,583 | 12/1957 | Schlecht et al. | 423/59 |
|---|---|---|---|
| 3,169,856 | 2/1965 | Mero | 423/DIG. 4 |
| 3,810,827 | 5/1974 | Kane et al. | 423/DIG. 4 |
| 3,869,360 | 3/1975 | Kane et al. | 423/DIG. 4 |
| 4,107,262 | 8/1978 | Lueders et al. | 423/DIG. 4 |

OTHER PUBLICATIONS

Brooks et al., "9th International Mineral Processing Congress", Prague, 1970.

*Primary Examiner*—Herbert T. Carter
*Attorney, Agent, or Firm*—Jerome M. Teplitz; A. Sidney Alpert; David N. Koffsky

[57] ABSTRACT

A process for separating molybdenum values from sea nodules which includes sulfation of the sea nodules, volatilization of the molybdenum values from the sea nodules and collection of the volatile molybdenum values.

8 Claims, No Drawings

METHOD FOR SEPARATING MOLYBDENUM VALUES FROM SEA NODULES

This invention relates to an improved method of recovery of metal values from ferromanganese nodules, commonly referred to as sea nodules, and more particularly to the recovery of molybdenum values from such nodules.

Sea nodules are aptly named in that they are found in the deep-sea beds and are primarily constituted of iron and manganese for which reason names such as ferromanganese and manganiferous have been employed. In addition to iron and manganese, recoverable quantities of valuable metals such as Ni, Co, and Cu are also present and it is the presence of such metals which has led to intensified efforts to develop practical and economical processes for recovery of the said metal values from sea nodules. Sea nodules also contain a considerable number of other metals at such low levels that they have not been separated and recovered, either because of prohibitive economics or the extreme difficulty of separation techniques. Included among such metal values are molybdenum values which are known to be present in sea nodules at levels of approximately 0.1% and lower. Such levels are not economically practical to separate and recover by the usual known methods. Nodule deposits can be found in all oceans but the Pacific Ocean remains the richest source with estimates of some 1.5 trillion metric tons of nodules present on the Pacific seafloor being replenished at the impressive rate of 10 million tons annually. The extraction and separation of copper, nickel, cobalt and manganese from sea nodules have proved to be an exceedingly complex metallurgical problem. Part of the complexity of course is the necessary consideration of the economics of commercial recovery of the said metals for which a number of various processes have been developed.

Of particular attractiveness are processes predicated on sulfation of sea nodules with sulfur dioxide. U.S. Pat. No. 3,169,856 describes a process of treating sea nodules with aqueous solution of sulfur dioxide to selectively separate nickel from cobalt, the bulk of the Ni, Mn and Cu being solubilized and the Co remaining in the insoluble nodule ore, presumably the iron oxide matrix. U.S. Pat. No. 3,810,827 describes a sulfation process wherein the ore is treated with gaseous sulfur dioxide in the absence of oxygen and then leached with water to separate the water-soluble manganese sulfate from the solid residue, which was subsequently treated as by sulfation with $SO_2$ and $O_2$ followed by water-leaching to obtain the water-soluble salts of Cu, Ni and Co. U.S. Pat. No. 3,869,360 describes a sulfation process which involves sulfation of an aqueous slurry of sea nodules using sulfur dioxide and oxygen including oxidation of the iron content of the sea nodule to iron oxide, and leaching the ore with water to separate the water-soluble salts.

With these various processes of sulfation, however, only incomplete and inefficient recovery of the Ni, Co and Cu are realized and there still remains a need for an improvement in the efficiency of recovery of the said metals.

An improved process for sulfation of nodule ores is described in concurrently filed, commonly assigned copending patent application Ser. No. 000,676 in which the sulfation, i.e., contact with sulfur dioxide is carried out in the presence of oxygen and in the substantial absence of water. Using the said process it is possible under preferred conditions to effect quantitative separation of nickel and cobalt and high yield separation of copper. Thus, the high recovery efficiency is particularly desirable in evaluation of this process from the viewpoint of economy, particularly in comparison with the prior art sulfation methods which are not known to achieve such high levels of efficiency.

BRIEF DESCRIPTION OF THE INVENTION

This invention provides an improvement in the process of sulfating sea nodule ores and is predicated on the discovery that the molybdenum values of the nodule ore can be volatilized after or during the sulfation process, in the latter instance, when sufficiently high temperature is employed in the sulfation step.

Thus, the molybdenum values of the nodule ore after volatilization can be recovered by condensing the volatilized form by the mere expediency of cooling the volatilized molybdenum values and collecting the condensed form to obtain the molybdenum values in substantially pure state. The initially condensed molybdenum values collected as a brown deposit which on cooling and exposure to atmospheric conditions turns blue, due to hydration to form molybdenum blue.

Accordingly, any sulfation process for treatment of sea nodules to convert the metal values to water-soluble salts can be employed to liberate the molybdenum values from the nodule ore structure which values can then be recovered by volatilization and condensation. Accordingly, low-temperature sulfation can be used, in the presence or absence of water, and high temperature sulfation can be used. Particularly effective sulfation processes are those carried out in the presence of oxygen, especially at elevated temperature and particularly under substantially dry conditions.

Accordingly, when the sulfation reaction is carried out at elevated temperatures, the molybdenum values can be volatilized at the reaction temperature as liberated from the nodule structure. Conveniently, a carrier gas can be passed through the heated sulfation mixture to entrain the volatile molybdenum values. When the sulfation reaction is carried out at low temperatures, e.g., 100° C. or lower, after completion of the reaction the dry reaction mass can be heated up to elevated temperatures where the molybdenum values are volatilized, preferably with a carrier gas.

After the molybdenum values are volatilized, the volatile product, i.e., oxides of molybdenum such as $MoO_3$ can then be conducted to a suitable collection apparatus and there collected by cooling.

For most purposes, elevated temperatures in the range of about 300° C. to about 600° C. preferably about 375° C. to about 400° C. will permit volatilization of the molybdenum values.

The present invention therefore provides a desirable by-product from the sulfation process for recovery of metal values and the overall economy of the recovery process is favorably affected by the value of the by-product.

DESCRIPTION OF PREFERRED EMBODIMENTS

The preferred sulfation process is that described in the aforesaid concurrently filed, commonly-assigned patent application.

The sea nodule ore selected for processing is preferably in finely-divided form in order to increase the efficiency of contact with the gaseous reactants, sulfur dioxide and oxygen. Thus, the ore can be pulverized or powdered to a finely-divided state. For most purposes, standard mesh sizes of about 30–200 are found quite suitable although larger or even smaller size can be employed. The size of the particles will merely dictate the time required for reaction and is otherwise not critical.

The sea nodule ore must be substantially dry before contact with the sulfur dioxide and oxygen. Drying of the ore, preferably in finely-divided state for increased efficiency, is accomplished by heating at elevated temperatures to remove water contained therein; the usual water content amounts to about 30% by weight of the sea nodule ore. Heating is continued until constant weight prevails, as is usual practice in such operation. Normally, temperatures in the range of from about 300° C. to about 600° C. are preferred for the drying step. Typically, a sample of the ore is heated in an oven while a stream of inert gas, e.g., helium, is passed through the sample. When constant weight is attained, the sample is substantially free of contained water. While it is preferred to drive out all of the contained water, it is possible to use samples of ore which contain small amounts of water, up to about 1–2% by weight based on the ore weight, which amounts of water can be driven out of the sample in the pre-heating to reaction temperature.

In a preferred form of the invention, the sample of ore is heated to the reaction temperature to remove contained water, i.e., until constant weight is attained, and is then reacted with the gaseous sulfation mixture.

For all purposes, the sample of ore should be "substantially free of water" and, as employed herein and in the appended claims, by this is meant that the sample should contain not more than 1% by weight of water based on the total sample weight.

The sulfation reaction, i.e., contact with sulfur dioxide and oxygen is to be carried out under substantially dry conditions by which is meant water should be preferably totally excluded from the reaction system but can be tolerated up to a level of about 1% by weight of the reaction system. Thus, minor amounts of water, i.e., less than 1% by weight, can be tolerated without significant effect on the reaction.

Any source of sulfur dioxide gas can be employed in the present process and the gas is dried before it enters the reaction zone. Conventional drying of the reaction gas can be employed where greater than 1% by weight of water, e.g., as water vapor, is present in the gas. The oxygen employed, which is dried conveniently along with the sulfur dioxide, or separately as desired, can be pure oxygen gas or air or mixtures thereof. The amounts of each gas added to the reaction zone is not critical since, being gaseous and inexpensive, the gases can be used in excess of the stoichiometric quantities required. The reactive gases may be employed as such or diluted with carrier gas such as helium. Thus, the sulfur dioxide and oxygen gases are added until take-up of the reacting gas ceases. Normally, the take-up of sulfur dioxide gas will vary somewhat with temperature so that, for example, the ore sample can absorb 379 mg. of gas per gram of sample at 300° C. whereas at higher temperatures, the absorption will increase and dramatically at certain temperature ranges. For example, at 350° C., 447 mg/g. is the absorption value, while at 400° C., 493 mg/g., but at 500° C. and above the up take of gas decreases, e.g., at 600° C., 379 mg/g. The optimum absorption of gas occurs within the range of from about 375° C. to about 425° C., and best results are obtained at optimum absorption of sulfur dioxide.

Accordingly, the temperature of the sulfation reaction is preferably that at which absorption of sulfur dioxide occurs at a reasonable rate, i.e., between about 300° C. and about 600° C., with the preferred range being from about 375° C. to about 425° C. Of course, sulfur dioxide absorption does occur at lower or higher temperatures but the reaction is slower due to lower absorption of gas, and such temperatures therefore are not preferred.

Conveniently, as sulfation of the ore proceeds, the original ore which is dark colored, usually dark brown, lightens to eventually a light tan color at full sulfation so that the process is conveniently monitored by visual inspection of the color of the sample. Completeness of sulfation is indicated by no further change in the color of the reaction mixture.

At this point, the molybdenum values will be substantially completely volatilized and collected in a suitable trap, e.g., an air-cooled trap in which they first condense as a brown deposit that turns blue on exposure to the atmosphere. The molybdenum compound is then recovered from the trap by any suitable means, e.g., water-washing to dissolve the molybdenum compound to provide a water solution thereof. The reaction vessel, of course, should be operatively connected to the trap during the heating step in order to collect the molybdenum as volatilized during the sulfation reaction.

After the sulfation reaction is completed and the molybdenum values collected, the reaction mixture is then treated with water to dissolve the water-soluble salts therefrom. For this purpose, the reaction mixture is usually pulverized into finely-divided state if the particles have coalesced during the sulfation step. This step, commonly referred to as leaching with water, can be accomplished with hot or cold water, as desired, depending on the concentration desired in the resulting solution. The leach water may contain sources of complex-formers or ligands to complex the various metal ions contained in the leach solution, permitting separation of these metal ions, e.g., based on differential solubility in organic solvents of the said complexes.

The leach solution should be separated from insoluble residues, mostly iron values, from the ore. The separation method is not critical and can be effected by any of the usual methods of separation of solids from liquid phases, e.g., filtration, centrifugation and decantation.

After separation, the metal values contained in the leach solution can be separated and thereafter recovered by art-recognized procedures, e.g., electrodeposition of the separated metal ions from solution.

Separation of the metal ions from the aqueous leach solution can be brought about in accordance with the procedures described in the aforesaid U.S. Pat. Nos. 3,169,856; 3,810,827; and 3,869,360, the recovery and separation disclosures of which are incorporated herein by reference.

A specific method which can be employed follows. The leach solution is adjusted to alkaline pH with ammonia to form ammine complexes of the contained metal ions. From this solution, the copper, nickel and cobalt can be successively extracted at successively higher pH values obtained by stepwise addition of ammonia employing known chelating agents and extraction techniques employing organic solvents. For example, a commercial chelating agent (LIX 64N) consisting of a mixture of 2-hydroxy-5-nonylbenzophenone oxime and 5,8-diethyl-7-hydroxy-6-dodecane oxime dissolved in kerosene (1.5% solution) can be used to effect the separation which is accomplished by raising the pH stepwise and extracting the so-adjusted solution with the kerosene solution of chelating agent. Successively, the copper, nickel and cobalt are removed leaving manganese in solution.

A variety of factors including stability of complexes, distribution coefficients between aqueous and organic phases, acid dissociation constants of ligands, and concentrations of various species control the extraction of the various metals. Thus, the pH for optimum results will vary with the chelating agent selected as well as the aforesaid factors.

The metal values can be separated from the complexes by methods known to the art, as by springing with a mineral acid such as sulfuric in the known manner. The resulting aqueous solutions can then be used for electrodeposition of the metal from solution by known methods.

The following examples further illustrate the invention.

EXAMPLE 1

Nodule ores are ground to higher than 200 mesh. One gram of the powdered ore was packed into a Vycor glass column with several layers of glass wool to avoid pressure build-up during gas flow. $SO_2$ (15 ml/min.) and $O_2$ (5 ml/min.) in helium was passed through the sample at a temperature of about 400° C. for two hours. The volatilized molybdenum values were condensed from the effluent in an air-cooled Vycor tube. The removal efficiency was 75%.

When this procedure was repeated using 80-100 mesh powdered ore, a 30% removal of molybdenum was realized under the same conditions, indicating that the sulfation reaction is somewhat incomplete with the larger particle size ore.

EXAMPLE 2

The procedure of Example 1 was repeated with a number of samples of nodule ore previously dried in an oven at 110° C. which removed 24.17% by weight of water based on the sample weight. The additional water (approximately 6%) was removed when the sample was heated to sulfation temperature the initial stages of sulfation at and during that temperature.

The samples employed were of 200 mesh size and the sulfation was carried out at various temperatures at 50° increments from 300° C. to 600° C. with the following weight increases of the sample (due to sulfation). The flow rates of the reactive gases was 15 ml/min for each gas and 30 ml/min. for helium.

The weight increases are given in Table 1.

TABLE 1

| Sulfation Temp (°C.) | Weight increase after sulfation (original sample weight was 1.0 g.) | | | |
|---|---|---|---|---|
| | 2 hr. | 3 hr. | 4 hr. | 5 hr. |
| 300 | 0.30 | 0.43 | 0.44 | 0.50 |
| 350 | 0.51 | 0.55 | 0.58 | 0.59 |
| 400 | 0.58 | 0.61 | 0.62 | 0.65 |
| 450 | 0.47 | 0.53 | 0.56 | 0.58 |
| 500 | 0.44 | 0.50 | 0.56 | 0.57 |
| 550 | 0.45 | 0.48 | 0.50 | 0.51 |
| 600 | 0.45 | 0.48 | 0.48 | 0.50 |

For each sample, the molybdenum values were trapped as in Example 1.

EXAMPLE 3

The procedure of Example 1 was repeated but at a sulfation temperature of 550° C. for 22 minutes using 15 ml/min. flow rate for $O_2$ and $SO_2$.

The sample was previously dried by heating at 550° C. for 24 hours. After the reaction was completed, the brown deposit of molybdenum values was removed from the condensing tube with 0.1 N NaOH.

EXAMPLE 4

The procedure of Example 3 was repeated except that 0.1 g of water was added to the sample prior to introducing $SO_2$ and $O_2$.

The formation of the brown deposit was less than that obtained in Example 3.

EXAMPLE 5

The procedure of Example 3 was repeated using only $O_2$ in lieu of $SO_2$ and $O_2$ and no colored deposit was obtained in the condensing tube.

This procedure was repeated using only $SO_2$ in lieu of $O_2$ with identical results, i.e., no colored deposit was obtained.

EXAMPLE 6

The procedure of Example 3 was repeated at room temperature up to 95° C., and no colored deposit was obtained.

What is claimed is:

1. A process for recovery of molybdenum values from ferromanganese sea nodule ores which comprises the steps of:
   (a) sulfating the nodule ore with sulfur dioxide in the presence of oxygen;
   (b) volatilizing the molybdenum values from the sulfated ore; and
   (c) condensing the volatilized molybdenum values from step (b) and collecting said molybdenum values in their thus condensed form.

2. The process according to claim 1 wherein the sulfating step is conducted at a temperature in the range of from about 300° C. to about 600° C. and the molybdenum values are volatilized during the sulfating step.

3. The process according to claim 1 wherein said sulfating step is continued to convert copper, nickel, cobalt, and manganese metal values of said nodule ore to water-soluble salts; the thus-produced metal salts are separated as a solution from water-insoluble residue by leaching with water; and said metal values are separated and recovered from said solution.

4. A process for recovery of molybdenum values from ferromanganese sea nodule ores which comprises the steps of:
   (a) contacting the nodule ore in substantially dry state with sulfur dioxide in the presence of oxygen under substantially dry conditions to convert metal values thereof excepting iron values to water-soluble salts;
   (b) volatilizing the molybdenum values from the so-contacted ore of step (a); and
   (c) condensing the volatilized molybdenum values from step (b) and collecting said molybdenum values in their thus condensed form.

5. The process according to claim 4 wherein the contacting step is conducted at a temperature in the range of from about 300° C. to about 600° C. and the molybdenum values are volatilized during the contacting step.

6. The process according to claim 4 wherein the contacting step is conducted at a temperature in the range of from about 375° C. to about 425° C. and the molybdenum values are volatilized during the contacting step.

7. The process according to claim 6 wherein the nodule ore in finely-divided state is heated at elevated temperatures until substantially dry prior to said contacting step.

8. A process for recovery of molybdenum values from ferromanganese sea nodule ores which comprises the steps of:
 (a) contacting the nodule ore in substantially dry, finely-divided state with sulfur dioxide in the presence of oxygen under substantially dry conditions and at an elevated temperature sufficient to volatilize the molybdenum values of said ore; and
 (b) condensing the molybdenum values volatilized from step (a) and collecting said molybdenum values in their thus condensed form.

* * * * *